United States Patent Office 3,436,418
Patented Apr. 1, 1969

3,436,418
FLUORINATED AROMATIC ESTERS
Pietro de Pietri Tonelli and Giorgio Rossi, Milan, and Alberto Barontini, San Donato Milanese, Italy, assignors to Montecatini Edison S.p.A., Milan, Italy
No Drawing. Filed Dec. 8, 1964, Ser. No. 416,919
Claims priority, application Italy, Dec. 12, 1963, 25,486/63; Sept. 2, 1964, 18,816/64
Int. Cl. C07c 79/46, 149/32, 69/76
U.S. Cl. 260—469
12 Claims

ABSTRACT OF THE DISCLOSURE

Described are fluorinated compounds of the formula

R—(O)$_m$—(CH$_2$)$_n$—COOCH$_2$CH$_2$F wherein $m$ is selected from zero and one, $n$ is selected from zero and one, when $m \leq n = 1$, R is a member selected from the group consisting of phenyl, phenyl substituted with a substituent selected from those consisting of Cl, OCH$_3$ and NO$_2$ group, a diphenyl and a naphthyl nucleus, and when $m=n=$zero, R is selected from the group consisting of styryl, mercaptotolyl and diphenylmethyl radical. These compounds are useful for disinfesting plants from mite and insect eggs.

The object of our invention is a new class of fluorinated aromatic esters having the Formula I:

R—(O)$_m$—(CH$_2$)$_n$—COO(CH$_2$)$_2$F    (I)

wherein $m$ is zero or 1 and $n$ is zero or 1. When $m \leq n = 1$, R is an aromatic nucleus and more particularly a phenyl nucleus (optionally substituted with a halogen, preferably chlorine, —OCH$_3$ or NO$_2$), a diphenyl or a naphthyl group, and when $m=n=$zero, R is a styryl, mercaptotolyl or diphenyl-methyl group.

Other objects of our invention are the pesticidal compositions containing said ester and their use against some plant pests and particularly against the winter and summer eggs of mites and insects.

It is known that some pesticidal substances are particularly active against the eggs of mites and insects. As a result of this specific activity, they are usually employed in controlling these pests.

In order to evaluate the ovicidal action of a product against the mite Metatetranychus ulmi Koch, it is necessary to ascertain whether the product is active towards the summer eggs or towards the winter eggs. It is well known that the winter eggs are much less easily attacked by the pesticidal agents than the summer eggs. The control of the winter eggs offers several advantages. However, in order to obtain good results with the usually employed products (e.g. oils and their mixtures with phosphoric esters), it is necessary to act after the bud opening with very appropriate timing of the sprays.

Unfavorable atmospheric conditions often prevent this timing while, on the other hand, phytotoxic effects may occur when carrying out the treatment on a vegetative stadium too far developed. The treatment in the middle of winter evidently does not present these difficulties and also avoids harming the numerous kinds of useful insects. The risks connected with the permanence of residues of the substances used in the treatments on the plants is also eliminated. Moreover, in practice, the possibility of control of the eggs of mites and insects in winter, i.e., in a period when the workers in the fruit-growing enterprises are less occupied, constitutes undoubtedly an advantage.

The treatments in the middle of winter were carried out up to now with mineral oils, with coal-tar derived oils or with mixtures thereof. The results were scanty because of the particular resistance of the winter eggs or by damaging the plants, if the applications, in very high doses, are repeated for several years.

We have now surprisingly found, and this is still another object of our invention, that the compounds belonging to class (I) not only have a high activity against the winter eggs of mites and insects in treatments carried out in winter, but are also active against adult mites and against their summer eggs. We also surprisingly found that the compounds of this class are scarcely active against other phytofagous insects. In other words, they have a selective action and act selectively only against some species and not against others.

The compounds which are the objects of the present invention are prepared by esterification of beta-fluoroethyl alcohol with the acids corresponding to the different meaning of R by operating as indicated by the known technique.

So, for example, the beta-fluoroethyl ester of diphenylacetic acid (also referred to hereinbelow as M2060) may be obtained according to one of the following preferred procedures:

(a) By reacting the chloride of diphenylylacetic acid with beta-fluoroethyl alcohol in the presence of pyridine:

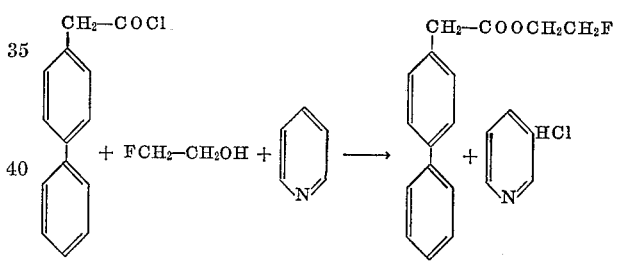

7.2 g. of beta-fluoroethyl alcohol and 8.7 g. of pyridine are dissolved in 50 cc. of methylene chloride. 23 g. of chloride of diphenylylacetic acid (prepared by action of thionyl chloride on diphenylylacetic acid; J. Org. Chem. 11, 798–802 (1946)) dissolved in 50 cc. of methylene chloride, are added to the stirred solution during 20 minutes at a temperature between 0° and +2° C.

When the addition is completed, the temperature is permitted to reach room temperature and the mixture is washed three times with 100 cc. of water. After drying on CaCl$_2$, the solvent is evaporated under reduced pressure. The residue obtained consists of 18 g. of a solid substance consisting prevailingly of the beta-fluoroethyl ester of diphenylacetic acid.

By crystallization from n-hexane, the pure product is obtained in the crystalline form, having—

Melting point=60.5–61.5° C.
F calculated=7.36%
F found=7.17%

(b) By reaction of an alkaline salt of diphenylylacetic acid with beta-fluoroethyl p-toluenesulfonate:

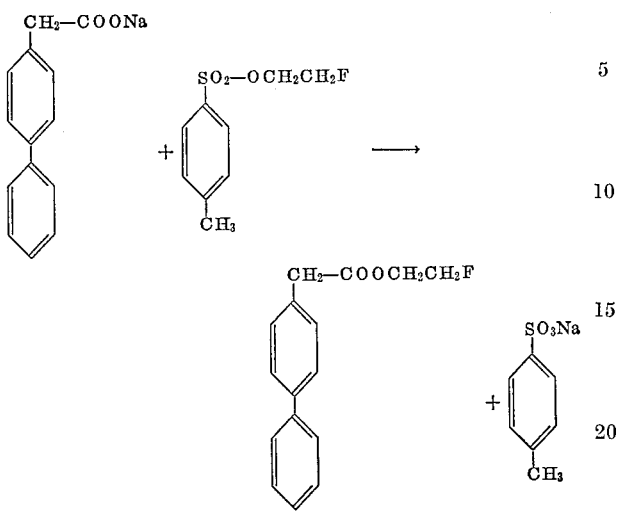

36 g. of 45.5% sodium hydroxide are added to 87 g. of diphenylacetic acid suspended in 400 cc. of water. To the solution thus obtained, 72.8 g. of beta-fluoroethyl p-toluenesulfonate (prepared according to Millington & Pattison—Can. J. Chem., 34, 1532–40 (1956)) are added and the whole is then refluxed for 5 hours. The reaction mixture is cooled, the precipitate is filtered off and carefully washed with water. 83 g. of a product consisting prevailingly of the beta-fluoroethyl ester of diphenylacetic acid are obtained. This substance can be purified by crystallization or by distillation under high vacuum (boiling point at 0.05 mm. Hg=about 135° C.).

(c) By reacting diphenylylacetic acid with beta-fluoroethyl alcohol in the presence of an acid catalyst and of a solvent forming an azeotropic mixture with water:

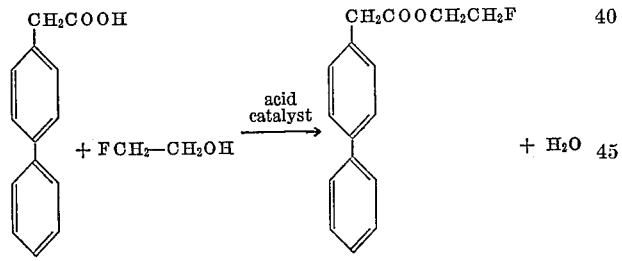

33.7 g. of beta-fluoroethyl alcohol and 52 g. of p-toluenesulfonic acid are added to 63.6 g. of diphenylacetic acid suspended in 200 cc. of benzene. The mixture is heated to the boiling point, while the water formed during the reaction is removed by distillation of the azeotropic mixture of benzene/water. The reaction mixture is cooled, washed with $H_2O$, then with a diluted $Na_2CO_3$ solution and fiinally again with water. By evaporating off the benzene solution under reduced pressure, a residue of 72 g. of a product, having a melting point of 53–56° C., consisting prevailingly of the beta-fluoroethyl ester of diphenylacetic acid, is obtained. The ester can be purified by crystallization or evaporation under high vacuum.

The following examples, in which other compounds of the general formula are obtained, are to further illustrate the invention without limiting its scope.

EXAMPLE 1

The following substances are charged in a ½-liter flask provided with an agitator, a thermometer and a dropping funnel:

Beta-fluoroethyl alcohol _____ g____ 18.2
Pyridine _____ g____ 21.8
$CH_2Cl_2$ _____ cc____ 80.0

49.87 g. of the chloride of p-nitrophenylacetic acid dissolved in 80 cc. of $CH_2Cl_2$ are then added dropwise while stirring at 0°–2° C. within half an hour. The exothermic reaction is cooled with an ice-salt bath. The pH is neutral or slightly acid. The mixture is thereafter permitted to reach room temperature and is then washed three times with 150 cc. of $H_2O$. The chloromethylenic solution is dried on $CaCl_2$ and is then evaporated under reduced pressure till constant weight at 30–40° C. 47.5 g. of a residue which crystallizes by cooling are obtained. This residue is crystallized with 1.850 cc. of boiling n-hexane. 9.4 g. of beta-fluoroethyl p-nitrophenylacetate,

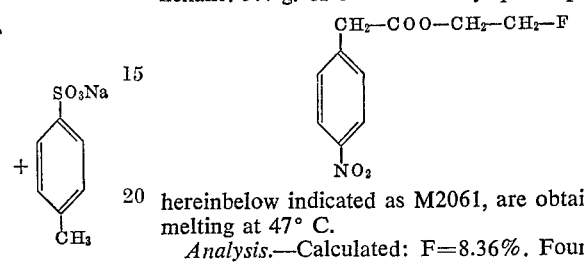

hereinbelow indicated as M2061, are obtained as crystals melting at 47° C.

Analysis.—Calculated: F=8.36%. Found: F=8.24%.

EXAMPLE 2

The following reactants are charged in a ½-liter flask provided with an agitator, a thermometer and a dropping funnel:

Beta-fluoroethyl alcohol _____ g__ 17.2
Pyridine _____ g__ 20.8
$CH_2Cl_2$ _____ cc__ 80.0

55 g. of the chloride of diphenylacetic acid dissolved in 80 cc. of $CH_2Cl_2$ at 0°/+2° C. are added dropwise within 30 minutes while stirring. The exothermic reaction is cooled with an ice/brine bath. The pH is slightly acid. The mixture is thereafter permitted to reach room temperature and is then washed three times with 150 cc. of $H_2O$. The chloromethylenic solution, after drying on $CaCl_2$, is evaporated under reduced pressure till constant weight at 30–40° C. 56 g. of a raw brown oil, consisting of beta-fluoroethyldiphenyl acetate, are obtained.

5 g. of this oil are treated with 50 cc. of warm n-hexane. The pitches are separated by decantation from the warm solution, which is then left to cool slowly and finally cooled with ice/water. The product separates as a yellow oil, which is removed from the solvent by decantation. The oily portion is kept on a water-bath under reduced pressure to eliminate any trace of solvent.

The residue is 3 g. of a clear yellow oil consisting of beta-fluoroethyldiphenyl acetate

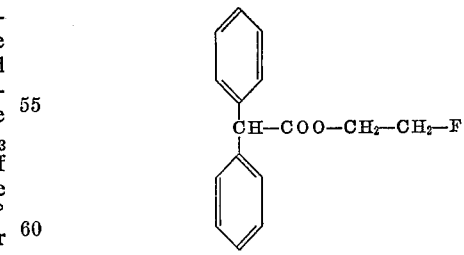

hereinbelow indicated as M2073.

Analysis.—Calculated: F=7.35%. Found: F=6.73–6.79%.

EXAMPLE 3

33.6 g. of phenylthioglycolic acid are added to 70 cc. of beta-fluoroethyl alcohol, and gaseous hydrochloric acid is bubbled for about 15–20 minutes till saturation, while cooling with water. The mixture is kept in a closed vessel for 4 days and then under vacuum while mildly heating in order to remove most of the alcohol excess. 70 cc. of methylene chloride are added and the whole is poured into 30 cc. of water. The product is washed with 50 cc. of a diluted aqueous $NaHCO_3$ solution tilll neutral pH, separated and washed again with 50 cc. of water. The chloromethylenic layer is dried on calcium chloride. The solvent is evaporated off under vacuum. The residue consists of 38 g. of oil, which is subjected to distillation under 0.2 mm. to yield 22 g. of an oily substance (boiling point of 97–99° C.) consisting of the beta-phenylfluoroethyl ester of phenylthioglycolic acid:

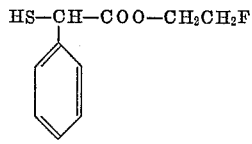

hereinbelow indicated as M1992.

*Analysis.*—Calculated: S=14.963%. Found: S=14.85–15.20%. Iodometric titer, 97.6%.

EXAMPLE 4

The following substances are introduced into a ½-liter flask provided with a device for the azeotropic elimination of the reaction water:

| | |
|---|---|
| Beta-naphthylacetic acid | g__ 50 |
| Benzene | cc__ 200 |
| p-Toluenesulfonic acid | g__ 46.2 |
| Fluoroethyl alcohol | g__ 30.6 |

The mixture is refluxed until H$_2$O is eliminated to yield a homogeneous solution. The solution is cooled, stirred and treated twice with 250 cc. of H$_2$O; it is then washed with 100 cc. of 5% Na$_2$CO$_3$ and then with 250 cc. of H$_2$O. The solution is evaporated under reduced pressure till constant weight thus yielding 59 g. of a brown oil which is distilled under reduced pressure (boiling point at 0.1 mm. Hg=134–138° C.). By crystallization from ligroin, 35 g. of white crystalline substance (melting point 37–38° C.) consisting of the beta-fluoroethyl ester of beta-naphthylacetic acid

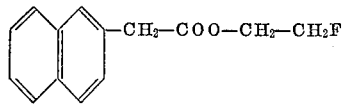

hereinbelow indicated as M2429, are obtained.

*Analysis.*—Calculated: F=8.18%. Found: F=8.29%.

EXAMPLE 5

The following substances are introduced into a ½ liter flask provided with a device for the azeotropic elimination of the reaction water:

| | |
|---|---|
| Cinnamic acid | g__ 21 |
| Benzene | cc__ 150 |
| Fluoroethyl alcohol | g__ 16 |
| p-Toluenesulfonic acid | g__ 24.5 |

The mixture is stirred and refluxed until the water is completely removed. After cooling to room temperature, it is washed twice with 200 cc. of H$_2$O, then with 160 cc. of 5% Na$_2$CO$_3$ and finally twice again with 200 cc. of water. The organic layer is evaporated under a residual pressure of 15 mm. (30°–40° C.). The residue consists of 27 g. of a brown oil which, by distillation under reduced pressure (boiling point at 0.01 mm. Hg=95-97° C.), gives 19.5 g. of an oily substance consisting of the beta-fluoroethyl ester of cinnamic acid.

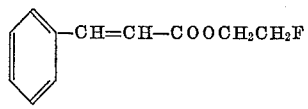

hereinbelow indicated as M2430.

*Analysis.*—Calculated: F=9.78%. Found: F=9.49%.

EXAMPLE 6

The following substances are charged in a ½-liter flask provided with a device for the azeotropic distillation of the reaction water:

| | |
|---|---|
| p-Toluenesulfonic acid | g__ 34.5 |
| Beta-naphthoxyacetic acid | g__ 40.5 |
| Benzene | cc__ 150 |
| Fluoroethanol | g__ 23 |

The mixture is stirred and refluxed until H$_2$O is eliminated. After cooling to room temperature, it is first washed twice with 250 cc. of water, then with 100 cc. of 5% Na$_2$CO$_3$ and finally twice again with 250 cc. of H$_2$O. The solution is then evaporated under reduced pressure to a constant weight at 30–40° C. The residue consists of 47 g. of a thick oil which is subjected to vacuum distillation (boiling point at 0.8 mm. Hg=146–148° C.) and gives about 40 g. of the beta-fluoroethyl ester of beta-naphthoxyacetic acid in the form of a solid having a low melting point:

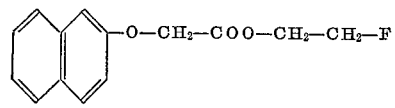

hereinbelow indicated as M2432.

*Analysis.*—Calculated: F=7.65%. Found: F=7.35%.

EXAMPLE 7

The following substances are introduced into a ½-liter flask provided with a device for the azeotropic elimination of the reaction water:

| | |
|---|---|
| Phenoxyacetic acid | g__ 30.4 |
| Benzene | cc__ 150 |
| p-Toluenesulfonic acid | g__ 34.4 |
| Fluoroethanol | g__ 23 |

The mixture is refluxed until water is completely eliminated. After cooling, it is washed twice with 150 cc. of water, then with 80 cc. of 5% Na$_2$CO$_3$ and finally with 150 cc. of water. The solution is evaporated under reduced pressure to a constant weight at 30–40° C., thus yielding 37 g. of a brown oil which, by distillation under a high vacuum (boiling point at 0.05 mm. Hg=105–106° C.), gives 31 g. of the beta-fluoroethyl ester of phenoxyacetic acid in the form of an oily liquid:

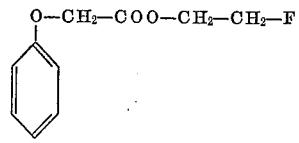

hereinbelow indicated as M2433.

*Analysis.*—Calculated: F=9.58%. Found: F=9.13%.

EXAMPLE 8

The following substances are charged into a ½-liter flask provided with a device for the azeotropic elimination of the reaction water:

| | |
|---|---|
| 2,4-dichlorophenoxyacetic acid | g__ 44.2 |
| Benzene | cc__ 150 |
| p-Toluenesulfonic acid | g__ 34.4 |
| Fluoroethanol | g__ 23 |

The mixture is refluxed until water is completely eliminated. After cooling to room temperature, it is washed twice with 150 cc. of H$_2$O, then with 80 cc. of 5% Na$_2$CO$_3$ and finally twice again with 150 cc. of water. The solution is evaporated under reduced pressure, by heating until elimination of the solvent. The residue consists of 52 g. of a thick brown oil which solidifies at room temperature. By crystallization from ligroin, the pure beta-fluoroethyl ester of 2,4-dichlorophenoxyacetic acid having a melting point of 43.5–44.5° C. and the following formula

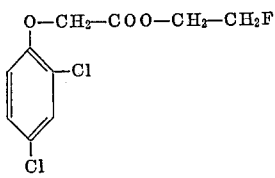

hereinbelow indicated as M2441, is obtained.
*Analysis.*—Calculated: F=7.11%. Found: F=7.10%.

EXAMPLE 9

The following substances are charged into a 1-liter flask provided with a device for the azeotropic elimination of the reaction water:

| | | |
|---|---|---|
| p-Methoxyphenylacetic acid | g— | 36.5 |
| Benzene | cc— | 150 |
| p-Toluenesulfonic acid | g— | 37.9 |
| Fluoroethyl alcohol | g— | 27.5 |

The mixture is refluxed until complete elimination of $H_2O$. After cooling to room temperature, it is washed twice with 150 cc. of $H_2O$ (after addition of 50 cc. of ether in order to favor the stratification), then with 780 cc. of 5% $Na_2CO_3$ and finally twice again with 150 cc. of water. The solution is dried on $CaCl_2$ and evaporated under vacuum at 30–40° C. The residue, subjected to distillation under high vacuum (boiling point at 0.05 mm. Hg=102–105° C.) gives 39.5 g. of an oily substance consisting of the beta-fluoroethyl ester of p-methoxyphenylacetic acid.

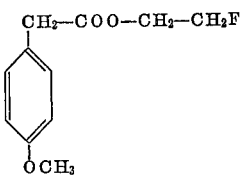

hereinbelow indicated as M2459.
*Analysis.*—Calculated: F=8.95%. Found: F=9.13%.

EXAMPLE 10

The following substances are charged into a ½-liter flask provided with a device for the azeotropic elimination of the reaction water:

| | | |
|---|---|---|
| Alpha-naphthylacetic acid | g— | 37.2 |
| Benzene | cc— | 150 |
| Beta-fluoroethyl alcohol | g— | 23 |
| p-Toluenesulfonic acid | g— | 34.5 |

The mixture is stirred and refluxed until the complete elimination of the reaction water. After cooling to room temperature, it is washed twice with 200 cc. of $H_2O$ and then with 100 cc. of 5% $Na_2CO_3$. The mixture is then washed twice again with water, using 200 cc. of $H_2O$ for each washing. The solution is evaporated under residual vacuum of 15 mm. at 30–40° C. till constant weight. The residue consists of 44 g. of a brown oil which, by distillation under high vacuum (boiling point at 0.05 mm. Hg=117–118° C.), gives 33 g. of beta-fluoroethyl ester of alpha-naphthylacetic acid in the form of an oily liquid having the structure:

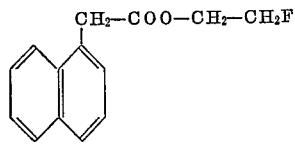

hereinbelow indicated as M2415.
*Analysis.*—Calculated: F=8.18%. Found: F=8.09%.

The following examples are illustrative of different possible applications of the compounds obtained in Examples 1 to 10.

Depending on the specific use, formulations of various types can be prepared:

(a) Powder formulations can be prepared by intimately mixing the active substances with inert fillers or diluents such as kaolin, talc, attapulgite, sepiolite, diatomaceous earths, artificial silicates, etc.

(b) Intimately mixing the active substances with a surfactant or with a mixture of surfactants, which may be selected from the group of the condensation products of ethylene oxide with alkylphenols or with higher aliphatic alcohols or from the group of calcium or sodium alkylbenzene (naphthalene) sulfonates, to prepare so-called wettable powders, i.e., formulations that are added to water in order to obtain suspensions employable for the disinfestation by means of spraying; and (c) Liquid formulations, which form emulsions in water can be prepared by addition of a surfactant or of a mixture of surfactants that may belong to the above-mentioned groups, to a solution of the active substances in a solvent.

By adding these formulations to water, emulsions ready for use are obtained. Liquid formulations on the basis of mineral oils associated with wetting emulsifiers and co-solvents, containing the compounds of the present invention, can usefully be employed, dispersed in water, in the treatment of plants infested by the pests.

The relative proportions of the active ingredient and of the other components of the formulations can vary within wide limits. Compositions have been prepared by dissolving 20 parts of a compound of the present invention (such as, e.g., M2060, M2432, M2433, M2459) in 75 parts of xylene, adding to the solution 5 parts of a 50/50 mixture of calcium dodecylbenzenesulfonates and of the condensation product of ethylene oxide and nonylphenol. All parts are by weight. The amount of formulation necessary to obtain the desired concentration of active substances is added to water while stirring. The emulsion obtained is sprayed onto the plants and the parts of plants infested by the pests.

Mineral oil formulations, particularly suitable for winter treatments, containing 2% of M2060 (or another of the aforementioned compounds), 75% of mineral oil (having a content of unsulfonable oil of 67–70% and a viscosity at 20° C. of 6.4µ), 15% of xylene and 8% of a commercial emulsifier consisting of a mixture of ethoxylated nonylphenol and of ethoxylated oleic acid, are prepared by mixing all the components until a clear solution is obtained.

Formulations of the wettable powder type containing 20% of a compound belonging to the class described herein, e.g., M2060, M2432, M2433, M2459, 74% of diatomaceous earths, 4% of sodium oleylmethyltaurinate, 1% of sodium butylnaphthylenesulfonate and 1% of naphthylmethondisulfonate, are prepared by intimately mixing the components of the formulations and grinding the mixture until the desired fineness is obtained.

By intimately mixing 3 parts of active substance with 97 parts of talc and grinding the whole to the desired fineness, formulations which can be used for treating the plants with dry dusting are obtained.

As stated above, the compounds of the present invention are particularly suitable for the control of mites and insects preferably with applications when the phytofagi are in the stage of eggs. These compounds have also an effective action against adult mites and summer eggs on which they act either directly by spraying or indirectly (residual effect).

They act selectively against adult insects since, e.g., while by direct spraying in the concentration of 1% they kill 100% of *Aphis fabae* and *Macrosiphum solani* and in the concentration of 0.1% they kill 60% and 60% respectively, they are practically inactive in the concentration of 1% against *Locusta migratoria, Carpocapsa pomonella, Lymantria dispar, Leptinotarsa decemlineata, Ceratitis capitata.*

The following examples demonstrate the activity of compounds of the present invention.

Data relating to the activity of compounds commonly used against adult mites (Fac), against eggs (Tedion) and against winter eggs (oleofos, mineral oils) are reported as comparison. From these data it is evident that these commonly used compounds act with a certain effectiveness only when the applications are carried out a few days before the hatching of the eggs, while the compounds according to the invention are effective also in case of winter application and act also against summer eggs and adults.

The compounds of our invention are, therefore, more effective for the control of eggs of mites and insects than those commonly used till now.

Another object of our invention is to provide means particularly effective and useful for the disinfestation of plants from winter eggs of mites and insects, while still another object is to provide means which couple the activity against winter eggs with the activity against the other life stages of mites so as to represent means for the complete control of these pests.

EXAMPLE 11

Activity against winter eggs of mites (*Metatetranychus ulmi*)

The determination of the activity on winter eggs was made on apple twigs infested with winter eggs of *Metatetranychus ulmi*. After spraying the twigs in laboratory with the active substances in aqueous emulsion, the twigs were kept in the open air under natural conditions until the beginning of spring, i.e., when the results were determined. To evaluate the results, a number of visibly vital eggs had been marked on each twig and after the hatching of non-treated eggs used as a control. The number of unhatched eggs was counted. The results were determined on the eggs and not on the mites population deriving therefrom: i.e., it was ascertained exclusively the ovicidal effect (inhibition of the hatching of the eggs) without taking into account the possible action of the products on the new-born acari. At the time of determining the results it was discovered that an appreciable percentage of non-treated eggs appeared altered due to predators and other natural non-established causes. This phenomenon involved a higher percentage of eggs (up to a maximum of about 20%) the longer the interval between the determination of the situation before the treatment and the determination of the results.

Considering the above-mentioned natural mortality, rather than to express numerically the values of the effect, obtained with the various products, it is preferred to report an evaluation by classes (see Table I), which gives an adequate idea of the results obtained and the activity ratio among the various products examined.

TABLE I

| Products | Concentration, percent of active substance | Ovicidal activity by application at the following months | | | |
|---|---|---|---|---|---|
| | | January | February | March | April |
| M2061 | 0.01 | + | + | ++ | ++ |
| | 0.1 | +++ | ++ | +++ | ++ |
| M2073 | 0.01 | + | 0 | 0 | ++ |
| | 0.1 | ++ | ++ | ++ | ++ |
| M1949 | 0.01 | + | + | ++ | ++ |
| | 0.1 | ++++ | ++++ | ++++ | ++++ |
| M1992 | 0.01 | 0 | 0 | + | 0 |
| | 0.1 | +++ | ++++ | +++ | + |
| M2415 | 0.01 | ---------- | 0 | 0 | ---------- |
| | 0.1 | ---------- | ++ | ++ | ---------- |
| M2429 | 0.01 | ---------- | + | ++++ | ---------- |
| | 0.1 | ---------- | ++++ | ++++ | ---------- |
| M2060 | 0.01 | ++++ | +++ | +++ | ++++ |
| | 0.1 | ++++ | +++ | ++++ | ++++ |
| M2430 | 0.01 | ---------- | 0 | +++ | ---------- |
| | 0.1 | ---------- | +++ | +++ | ---------- |
| M2432 | 0.01 | ---------- | 0 | ++++ | ---------- |
| | 0.1 | ---------- | ++++ | ++++ | ---------- |
| M2433 | 0.01 | ---------- | 0 | 0 | ---------- |
| | 0.1 | ---------- | ++++ | ++ | ---------- |
| M2441 | 0.01 | ---------- | + | 0 | ---------- |
| | 0.1 | ---------- | ++++ | +++ | ---------- |
| M2459 | 0.01 | ---------- | 0 | + | ---------- |
| | 0.1 | ---------- | +++ | + | ---------- |

| Products | Concentration, percent of active substance | Ovicidal activity by application at the following months | | | |
|---|---|---|---|---|---|
| | | January | February | March | April |
| Tedion [1] | 0.01 | 0 | 0 | 0 | ---------- |
| | 0.1 | 0 | + | 0 | ---------- |
| Oleofos | 1.12 (oil) | 0 | 0 | 0 | ++ |
| 5 [2] | 2.24 (oil) | 0 | 0 | ---------- | +++ |
| Oil [3] | 1.12 (oil) | 0 | 0 | + | 0 |
| | 2.24 (oil) | 0 | 0 | + | ++ |

[1] 2,4,-5,4-tetrachlorodiphenylsulfone.
[2] Oily formulation containing 5% of Parathion.
[3] Emulsifiable mineral oil.

Reading:
  o=mortality of 50%.
  +=mortality from 50 to 60%.
  ++=mortality from 60 to 70%.
  +++=mortality from 70 to 80%.
  ++++=mortality ≥80%.

EXAMPLE 12

Activity tests were carried out on *Metatetranychus ulmi* acaricide-resistant strain, in the stage of adults and of summer eggs. The following methods were used for determining the activity:

The acaricidal activity on adults was determined by direct spraying on discs of apple leaves;

The ovicidal activity was determined by infesting discs of apple leaves with 100 female adults; after 24 hours, the females are removed and the discs with the eggs are sprayed with formulation containing the active substances and kept at 24–26° C. in open Petri dishes until a few days after the hatching date of the checks.

The ovicidal activity by "residual" effect was determined by spraying, with formulations containing the active substances, the discs taken from apple leaves. After 2 hours the females were transferred onto these discs, kept on wet cotton in covered Petri dishes, and were left to lay the eggs on the treated surface of the leaves. After 24 hours, the females were removed. The percentage of hatched eggs is calculated after the hatching of the eggs laid on non-treated discs used as a check.

The data observed are reported in Table II.

TABLE II

[Summing up the activity of esters of fluoroethyl alcohol belonging to Class (I) on adults and on summer eggs of the two species of mites tested, giving the values obtained by classes of effectiveness]

| Active substance | *Tetranichus urticae* Koch | | | *Metatetranychus ulmi* Koch [1](°) | | |
|---|---|---|---|---|---|---|
| | Adults | Eggs | | Adults | Eggs | |
| | Direct spraying | Direct spraying | Residual effect | Direct spraying | Direct spraying | Residual effect |
| M2060 | + | ++++ | +++ | +++ | ++++ | +++ |
| M2415 | + | ++++ | ++ | +++ | ++++ | +++ |
| M2429 | ++ | ++++ | +++ | ++ | ++++ | +++ |
| M2430 | + | ++++ | + | ++ | +++ | +++ |
| M2432 | + | ++++ | ++ | ++ | +++ | +++ |
| M2433 | + | ++ | 0 | ++ | +++ | +++ |
| M2441 | ++ | +++ | ++ | ++ | +++ | ++ |
| M1992 | | | | ++ | ++ | +++ |
| M1949 | 0 | +++ | + | ++ | ++++ | + |
| M2061 | + | ++++ | ++ | ++ | +++ | ++++ |
| M2073 | + | ++++ | ++ | ++ | +++ | +++ |
| M2459 | + | +++ | ++ | +++ | +++ | +++ |
| Fac (2°) | | | | + | 0 | 0 |
| Tedion [3] | | | | + | ++ | ++ |

[1] Strain resistant to the action of Fac.
[2] Isopropylamide of O,O-diethyldithiophosphorylacetic acid.
[3] 2,4-5,4-tetrachlorodiphenylsulfone.

Reading:
  o=mortality of 25% with 1% of active substance.
  +=mortality from 25 to 100% with 1% of active substance.
  ++= mortality from 25 to 100% with 0.1% of active substance.
  +++=mortality from 25 to 100% with 0.01% of active substance.
  ++++=mortality from 25 to 100% with 0.001% of active substance.

EXAMPLE 13

Open field treatments were carried out on apple trees infested with eggs of *Aphis pomi*, on Feb. 4, 1964, at Govone (Asti, Italy). The treatment was carried out by direct spraying with aqueous solutions containing M2060 as the active substance.

Beginning of eggs' hatching: March 24.
End of eggs' hatching: April 10.

TABLE III

| Active substance | Active substance concentration, percent | Marked eggs | non-hatched eggs | Ovicidal effect in percent (corrected for the mortality of the checks) |
|---|---|---|---|---|
| M2060 | 0.4 | 241 | 208 | 85.3 |
| M2060 | 0.8 | 208 | 194 | 92.8 |
| Mixture comprising: | | | | |
| M2060 | 0.4 | 208 | 197 | 94.3 |
| Mineral oil | 3 | | | |
| Oleofos [1] 5 | 1.5 | 642 | 389 | 57.7 |
| Check | | 414 | 28 | |

[1] Mineral oil plus 5% of Parathion.

We claim:
1. Fluorinated compounds of the formula

$$R-(O)_m-(CH_2)_n-COOCH_2CH_2F$$

wherein $m$ is selected from zero and one, $n$ is selected from zero and one,
when $m \leq n = 1$, R is a member selected from the group consisting of phenyl, phenyl substituted with a substituent selected from those consisting of Cl, $OCH_3$ and $NO_2$ group, a diphenyl and a naphthyl nucleus,
and when $m = n =$ zero, R is selected from the group consisting of styryl, mercaptotolyl and diphenylmethyl radical.

2. The compound of the formula

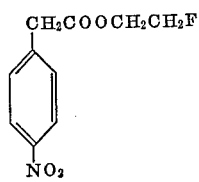

3. The compound of the formula

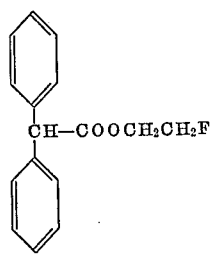

4. The compound of the formula

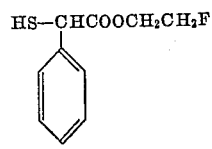

5. The compound

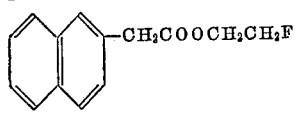

6. The compound

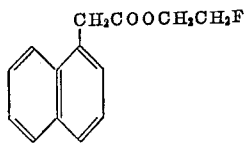

7. The compound

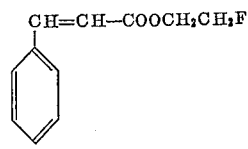

8. The compound

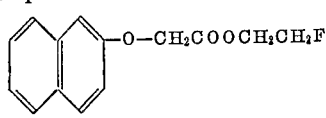

9. The compound

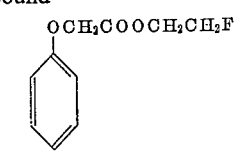

10. The compound

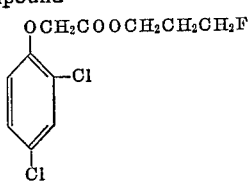

11. The compound of the formula

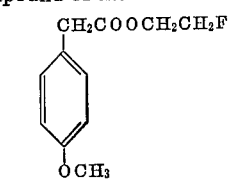

12. The compound

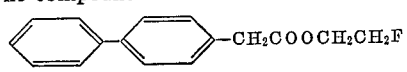

References Cited

Sharfstein: Chem. Abstracts, vol. 51, p. 3523i, 1957. QD1A51.

Newman et al.: Jour. Am. Chem. Soc., vol. 69, pp. 718–20 and 723, 1947. QD1A5.

Pattison et al.: Canadian Jour. Technology, vol. 34, pp. 21–28, 1956. T1C2.

Migrdichian: Organic Synthesis, Reinhold, N.Y., 1957, p. 319. QD262M55.

JAMES A. PATTEN, *Primary Examiner.*

E. GLEIMAN, *Assistant Examiner.*

U.S. Cl. X.R.

260—471, 476, 473, 470; 167—30, 31, 32